(12) United States Patent
Nolan et al.

(10) Patent No.: US 11,505,042 B2
(45) Date of Patent: Nov. 22, 2022

(54) VEHICLE HAVING REINFORCEMENT PATCH

(71) Applicants: Lawrence J Nolan, Livonia, MI (US); Michael E LaFleur, Brighton, MI (US); Jerome R Pfeifer, Livonia, MI (US)

(72) Inventors: Lawrence J Nolan, Livonia, MI (US); Michael E LaFleur, Brighton, MI (US); Jerome R Pfeifer, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 30 days.

(21) Appl. No.: 16/815,607

(22) Filed: Mar. 11, 2020

(65) Prior Publication Data

US 2021/0283997 A1 Sep. 16, 2021

(51) Int. Cl.
| | | |
|---|---|---|
| *B60J 5/00* | (2006.01) | |
| *B60J 5/04* | (2006.01) | |
| *B32B 5/02* | (2006.01) | |
| *B32B 3/26* | (2006.01) | |
| *B32B 27/12* | (2006.01) | |

(52) U.S. Cl.
CPC .............. *B60J 5/042* (2013.01); *B32B 3/266* (2013.01); *B32B 5/02* (2013.01); *B32B 27/12* (2013.01); *B60J 5/048* (2013.01); *B32B 2262/101* (2013.01); *B32B 2405/00* (2013.01); *B60J 5/045* (2013.01); *B60J 5/0413* (2013.01); *B60J 5/0455* (2013.01)

(58) Field of Classification Search
CPC . B60J 5/042; B60J 5/048; B60J 5/0413; B60J 5/0455; B60J 5/045; B60J 5/0452; B60J 5/0451; B60J 5/0443; B60J 5/0423; B32B 3/266; B32B 3/12; B32B 5/02; B32B 15/02; B32B 2262/101; B32B 2405/00; B32B 2519/00
USPC ....................................................... 296/146.6
See application file for complete search history.

(56) References Cited

U.S. PATENT DOCUMENTS

| | | | | |
|---|---|---|---|---|
| 5,395,135 | A * | 3/1995 | Lim ...................... | B60J 5/0451 280/751 |
| 5,399,406 | A * | 3/1995 | Matsuo ................... | B32B 3/12 428/57 |
| 6,752,450 | B2 * | 6/2004 | Carroll, III ............. | B32B 3/28 188/371 |
| 8,056,962 | B2 * | 11/2011 | Tauchi .................... | B60R 21/04 296/187.05 |
| 8,091,286 | B2 * | 1/2012 | Totani .................... | B60J 5/0412 49/502 |
| 8,118,347 | B2 * | 2/2012 | Kawashima ........... | B60R 21/04 296/187.05 |
| 8,152,218 | B2 * | 4/2012 | Hall ....................... | B60J 5/0451 296/146.6 |
| 9,004,529 | B2 * | 4/2015 | Torii ...................... | B60J 5/0451 280/730.2 |

(Continued)

*Primary Examiner* — Jerry E Redman
(74) *Attorney, Agent, or Firm* — Ralph E. Smith

(57) ABSTRACT

A vehicle includes a vehicle body and a reinforcing patch. The vehicle body component defines a cavity. The reinforcing patch is disposed within and attached to the vehicle body component. The reinforcing patch includes a substrate and a reinforcing body attached to the substrate. The reinforcing body has a first tab, a second tab, and a first slit between the first and second tabs. The slit is at least partially filled by the substrate.

9 Claims, 3 Drawing Sheets

(56) References Cited

U.S. PATENT DOCUMENTS

| | | | |
|---|---|---|---|
| 9,527,370 B2 | 12/2016 | Scott et al. | |
| 10,336,276 B2* | 7/2019 | Tallapragada | B60R 21/0428 |
| 10,583,760 B2* | 3/2020 | Vemulapati | B60N 2/70 |
| 11,130,392 B2* | 9/2021 | Williams | B60J 5/0461 |
| 2004/0113455 A1* | 6/2004 | Schmidt | B60J 5/0455 |
| | | | 296/146.6 |
| 2016/0059678 A1* | 3/2016 | Tamaoki | B60J 5/045 |
| | | | 49/501 |
| 2018/0111351 A1* | 4/2018 | Madaus | B29C 66/73111 |
| 2018/0257597 A1* | 9/2018 | Migaki | F16F 7/12 |
| 2020/0325291 A1* | 10/2020 | Nakano | B32B 5/26 |
| 2021/0122216 A1* | 4/2021 | Suzuki | B62D 25/10 |
| 2021/0283997 A1* | 9/2021 | Nolan | B32B 3/266 |

\* cited by examiner

VEHICLE HAVING REINFORCEMENT PATCH

FIELD

The present disclosure relates to a vehicle having a reinforcement patch.

BACKGROUND

This section provides background information related to the present disclosure and is not necessarily prior art.

Some vehicles include reinforcement patches that are disposed within and coupled to a vehicle door to increase the strength and stiffness of the vehicle door. Some reinforcement patches can cause surface distortions to the vehicle door when the vehicle is baked and cured. The present disclosure provides a reinforcement patch that is allowed to conform to the vehicle door during the vehicle baking and curing cycle, which minimize the surface distortions in the door while providing the benefit of added stiffness and strength to the door.

SUMMARY

This section provides a general summary of the disclosure, and is not a comprehensive disclosure of its full scope or all of its features.

In one form, a vehicle includes a vehicle body and a reinforcing patch. The vehicle body component defines a cavity. The reinforcing patch is disposed within and attached to the vehicle body component. The reinforcing patch includes a substrate and a reinforcing body attached to the substrate. The reinforcing body has a first tab, a second tab, and a first slit between the first and second tabs. The slit is at least partially filled by the substrate.

In some configurations of the vehicle of the above paragraph, the reinforcing body includes a plurality of first slits and a plurality of second slits formed therein that cooperate to form the first and second tabs in the reinforcing patch.

In some configurations of the vehicle of any one or more of the above paragraphs, the first slits are angled such that the first slits extend toward a rear end of the reinforcing patch as the first slits extend toward a lower edge of the reinforcing patch. The second slits are angled such that the second slits extend toward a front end of the reinforcing patch as the second slits extend toward the lower edge of the reinforcing patch.

In some configurations of the vehicle of any one or more of the above paragraphs, the tabs are diamond-shaped.

In some configurations of the vehicle of any one or more of the above paragraphs, the tabs are movable independently of each other.

In some configurations of the vehicle of any one or more of the above paragraphs, the substrate is made of an epoxy.

In some configurations of the vehicle of any one or more of the above paragraphs, the reinforcing body is a cloth made of fiberglass.

In some configurations of the vehicle of any one or more of the above paragraphs, the vehicle body is a door including an outside panel and an inside panel, the reinforcing patch attached to an inner surface of the outside panel.

In some configurations of the vehicle of any one or more of the above paragraphs, the door is made of aluminum.

In another form, the present disclosure discloses a method that includes attaching a reinforcement patch to a vehicle body component, the reinforcement patch including a substrate and a reinforcing body attached to the substrate, the reinforcing body having a first tab, a second tab, and a first slit between the first and second tabs; heating the vehicle body component to move first and second tabs away from each other to widen the slit between the first and second tabs; allowing the substrate to flow into the slit; and allowing the vehicle body component to cool, thereby moving the first and second tabs toward each other and hardening the substrate within the slit.

In some configurations of the method of the above paragraph, the reinforcing body includes a plurality of first slits and a plurality of second slits formed therein that cooperate to form the first and second tabs in the reinforcement patch.

In some configurations of the method of any one or more of the above paragraphs, the first slits are angled such that the first slits extend toward a rear end of the reinforcement patch as the first slits extend toward a lower edge of the reinforcement patch, and the second slits are angled such that the second slits extend toward a front end of the reinforcement patch as the second slits extend toward the lower edge of the reinforcement patch.

In some configurations of the method of any one or more of the above paragraphs, the first and second tabs are diamond-shaped.

In some configurations of the method of any one or more of the above paragraphs, the substrate is made of an epoxy.

In some configurations of the method of any one or more of the above paragraphs, the reinforcing body is a cloth made of fiberglass.

In some configurations of the method of any one or more of the above paragraphs, the vehicle body component is a door including an outside panel and an inside panel. The reinforcing patch is attached to an inner surface of the outside panel.

In some configurations of the method of any one or more of the above paragraphs, allowing the substrate to flow into the slit includes cooling the vehicle body component to force the substrate into the slit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
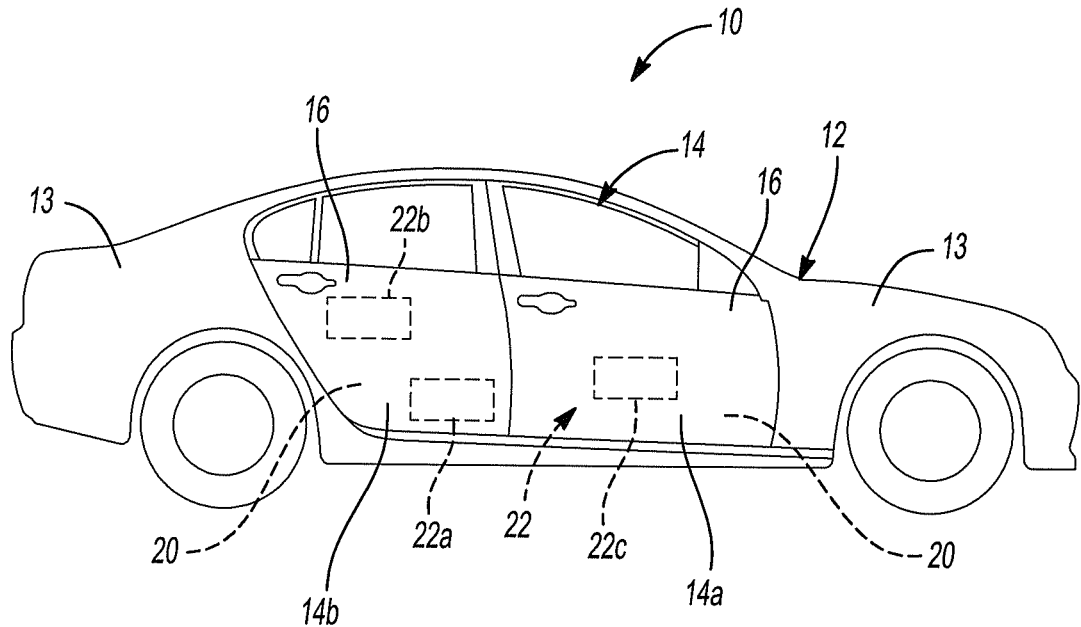
FIG. 1 is a side view of a vehicle having reinforcement patches according to the principles of the present disclosure.
Figure 3:
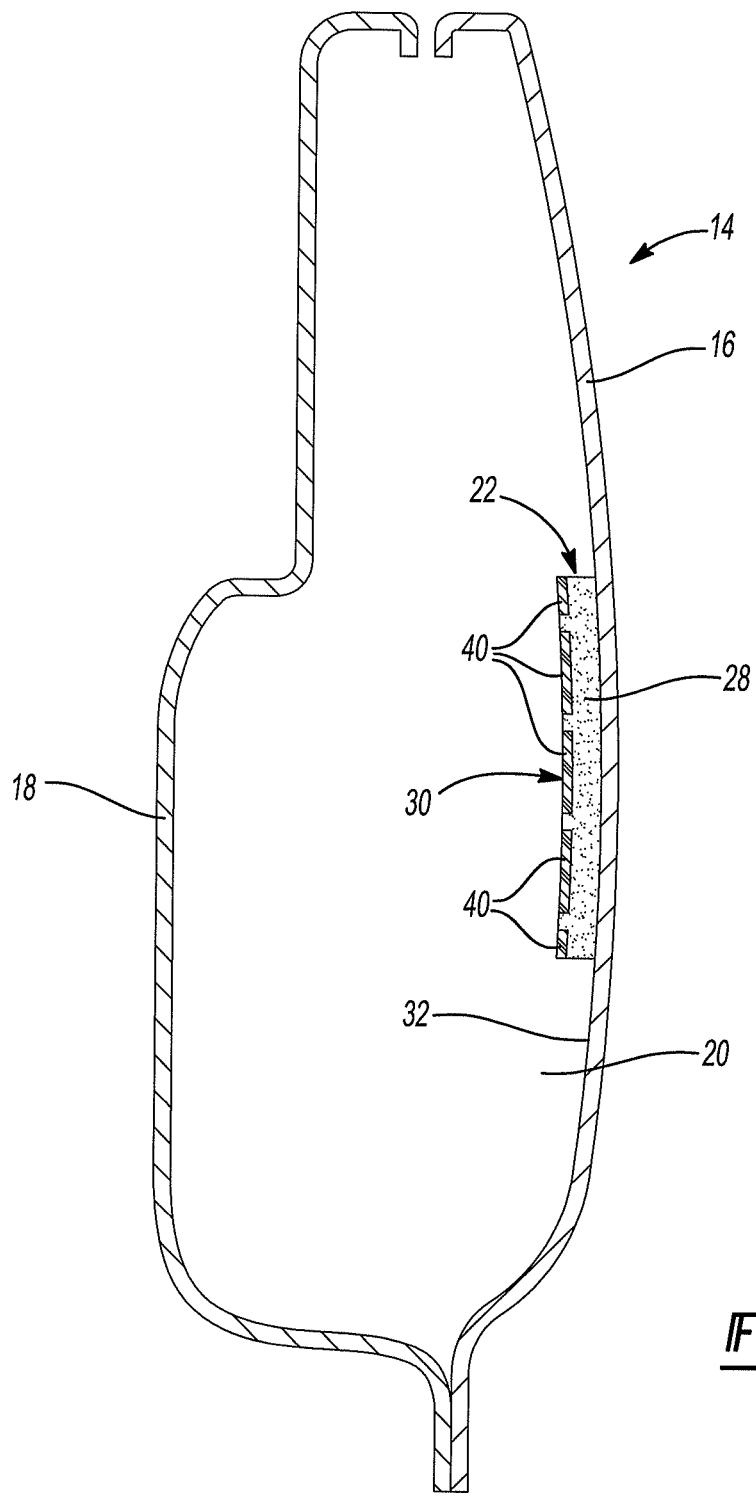
FIG. 3 is a cross-sectional view of a vehicle door of FIG. 1 having a reinforcement patch disposed therein after baking and curing.
Figure 4:
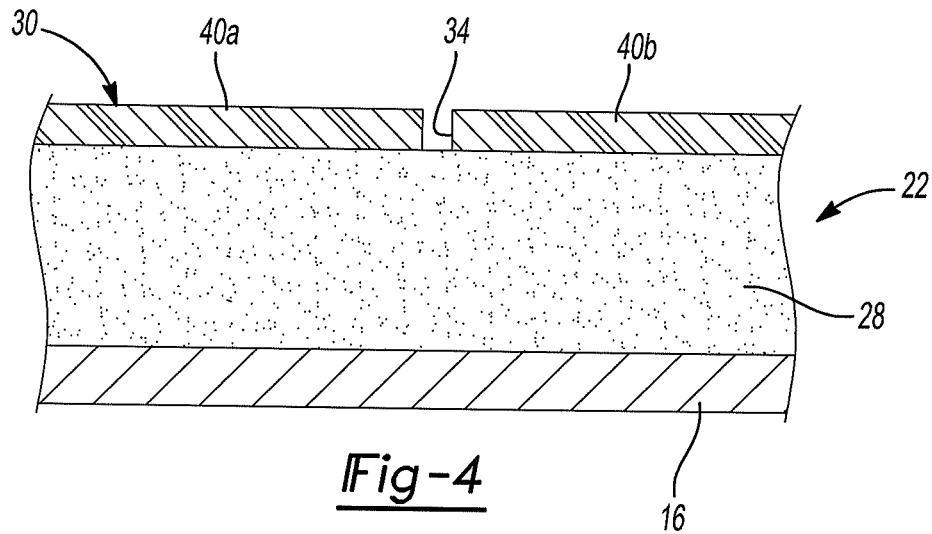
FIG. 4 is a cross-sectional view of the reinforcement patch before baking and curing.

As shown in FIG. 1, a vehicle 10 is provided. The vehicle 10 includes a vehicle body 12 having vehicle body components (e.g., body panels 13, a plurality of doors 14, etc.). With reference to FIGS. 1 and 3, each door 14 is made of a metallic material (e.g., aluminum, steel, etc.) and includes an outer door panel 16 and an inner door panel 18 (FIG. 3) that define a door cavity 20 therebetween. The doors 14 include one or more reinforcement patches 22 (comprising patches 22a, 22b, 22c, for example) that provide strength and stiffness to the doors 14.

As shown in FIG. 1, the reinforcing patches 22a, 22b are disposed in the door cavity 20 of the door 14b and are attached (bonded) to the door 14b. Similarly, the reinforcing patch 22c is disposed in the door cavity 20 of the door 14a and is attached (bonded) to the door 14a. It is also understood that one or more reinforcing patches 22 can also be disposed in the door cavities of the front driver side door and the rear driver side door in addition to being disposed in the door cavities 20 of the front passenger side door 14a and the rear passenger side door 14b. Each reinforcing patch 22 extends in a longitudinal direction of the vehicle 10 and includes fore and aft ends 24, 26 that are scalloped 27 to better conceal the reinforcing patch 22 from view from a person looking at the outer door panel 16 from outside of the vehicle 10.

Figure 2:
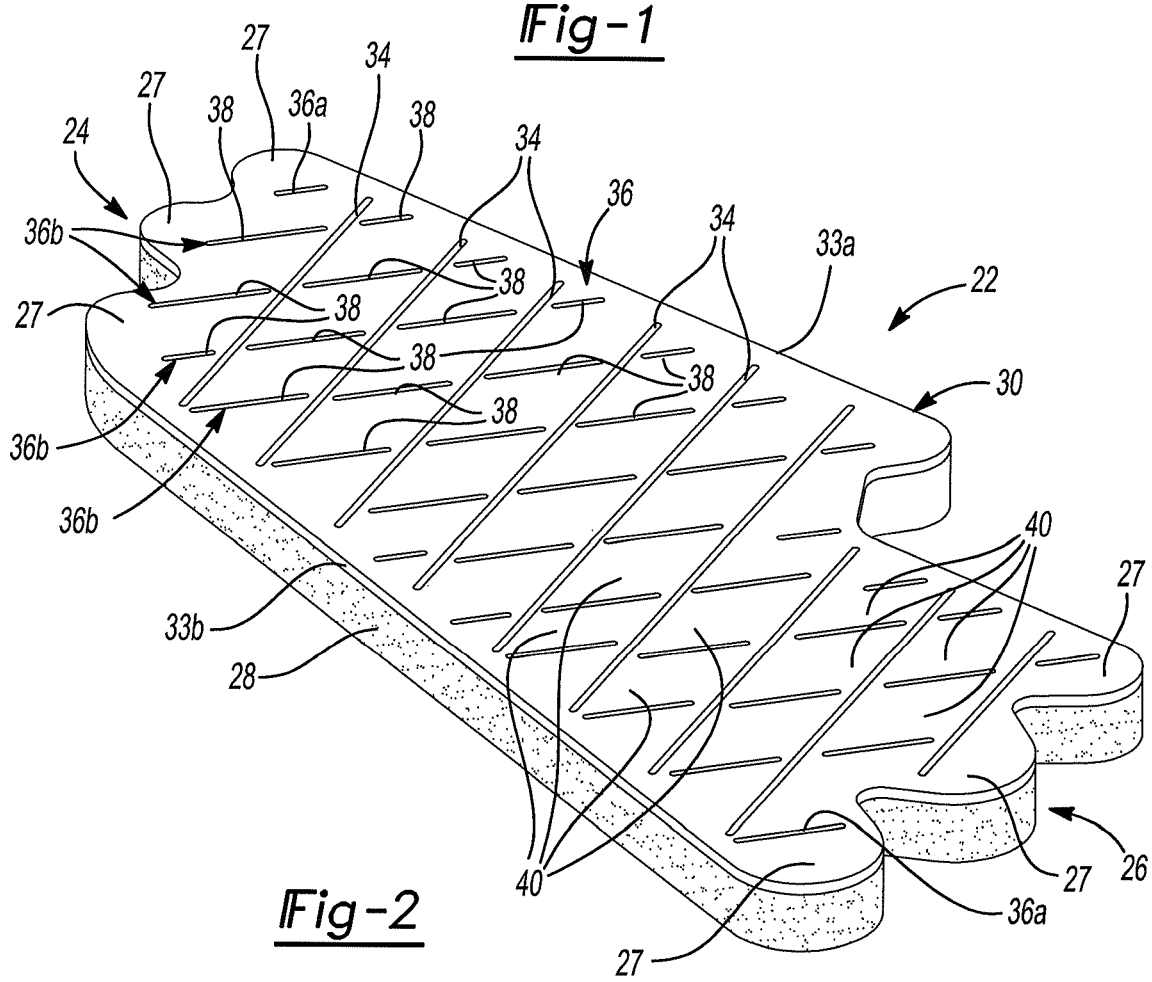
FIG. 2 is a perspective view of one reinforcement patch of the reinforcement patches of FIG. 1 before baking and curing.

As shown in FIGS. 2 and 3, each reinforcing patch 22 includes a substrate 28 and a reinforcing body 30. The substrate 28 is made of an adhesive material such as epoxy, for example, and is attached (bonded) to the reinforcing body 30. The substrate 28 is also expandable. The substrate 28 is also attached (bonded) to an inside surface 32 of the outer door panel 16 (FIG. 3). The reinforcing body 30 is spaced apart from the outer door panel 16 and the inner door panel 18, and can be a cloth made of fiberglass material, for example. Upper and lower edges 33a, 33b of the reinforcing body 30 are straight.

As shown in FIG. 2, a plurality of first slits 34 and a plurality of second slits 36 are formed in the reinforcing body 30. The first and second slits 34, 36 extend through the reinforcing body 30. The first slits 34 are angled such that the first slits 34 extend toward an aft end 26 of the reinforcement patch 22 (and the vehicle 10) as the first slits 34 extend toward the lower edge 33b of the reinforcement patch 22. The first slits 34 are continuous slits (i.e., do not include breaks or discontinuities) and can have differing lengths from each other.

The second slits 36 (comprising end slits 36a and intermediate slits 36b) are angled such that the second slits 36 extend toward the fore end 24 of the reinforcing patch 22 (and the vehicle 10) as the second slits 36 extend toward the lower edge 33b of the reinforcing patch 22. The second slits 36a are positioned at or near the fore and aft ends 24, 26 of the reinforcing patch 22 and are singular, continuous slits. The second slits 36b are positioned between the second slits 36a and are discontinuous slits (i.e. includes breaks or discontinuities). That is, each second slit 36b includes two or more sections 38 that are spaced apart from each other. At least one of the sections 38 of each slit 36b is disposed between two of the first slits 34 and is spaced apart from the two of the first slits 34 (i.e., the at least one of the sections 38 does not intersect the two of the first slits 34).

It should be understood that the first slits 34 can be discontinuous and the second slits 36 can be continuous. It should be also understood that, in some configurations, some of the first slits 34 can be continuous and some of the first slits 34 can be discontinuous, and some of the second slits 36 can be continuous and some of the second slits 36 can be discontinuous.

The second slits 36 cooperate with the first slits 34 to form diamond shaped tabs 40 in the reinforcing body 30. Each tab 40 is movable independently of the other tabs 40 as will be described in more detail below. In some configurations, the tabs 40 can be other shapes (e.g., triangular, square etc.) although the advantages of the reinforcement patch 22 are most effective with diamond shaped tabs 40.

With continued reference to FIGS. 1-6, a method for baking and curing the vehicle 10 having the reinforcement patches 22 disposed within the doors 14 will now be described in more detail. First, the reinforcement patches 22 are disposed within and attached (e.g., adhesively bonded) to the respective doors 14 as described above.

Next, the vehicle 10 is baked (i.e. heated) in a chamber (not shown) to a temperature of 380 degrees Fahrenheit, for example. During baking of the vehicle 10, the outer door panel 16 of the doors 14 expands (e.g., the outer door panel 16 can expand 2 mm) and the reinforcing body 30 of the reinforcement patches 22 does not expand (or expands very little). That is, the coefficient of thermal expansion of the material of the doors 14 is high which causes the outer door panel 16 to expand during baking of the vehicle 10, and the coefficient of thermal expansion of the material of the reinforcement body 30 is low which causes the reinforcement body 30 to remain substantially the same size during baking of the vehicle 10. It should be noted that during vehicle baking, the substrate 28 also expands.

Figure 5:
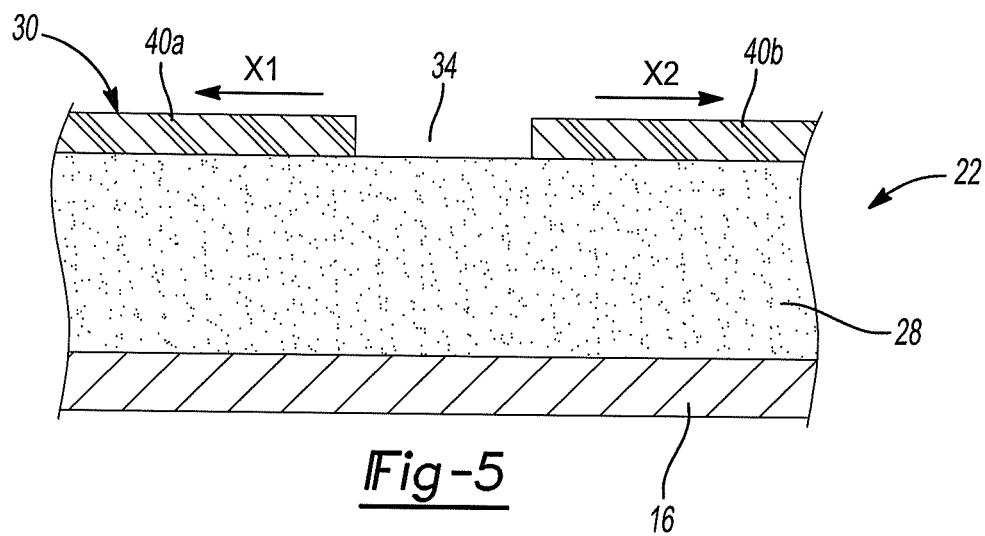
FIG. 5 is a cross-sectional view of the reinforcement patch after baking and before curing.

The first and second slits 34, 36 formed in the reinforcing body 30 allow the tabs 40 to move independently of each other when the vehicle 10 is baked, thereby allowing each reinforcement patch 22 to conform to the respective door 14 as the door 14 expands. For example, as shown in FIG. 5, the tab 40a may move in one direction (X1) when the vehicle 10 is baked while the tab 40b may move in another direction (X2) that is opposite the one direction when the vehicle 10 is baked, thereby widening the slit 34 (FIG. 5) between the tabs 40a, 40b. For example, the tab 40a can move toward the fore end 24 of the reinforcement patch 22 while the tab 40b moves toward the aft end 26 of the reinforcement patch 22. In another example, the tab 40a can move toward one of the upper edge 33a of the reinforcing body 30 while the tab 40b moves toward the lower edge 33b of the reinforcing body 30. In yet another example, the tab 40a can move toward one of the upper and lower edges 33a, 33b of the reinforcing body 30 while the tab 40b moves toward one of the fore and read ends 24, 26 of the reinforcement patch 22. It should be understood that the slits 36 can also be widened during baking of the vehicle 10.

Figure 6:
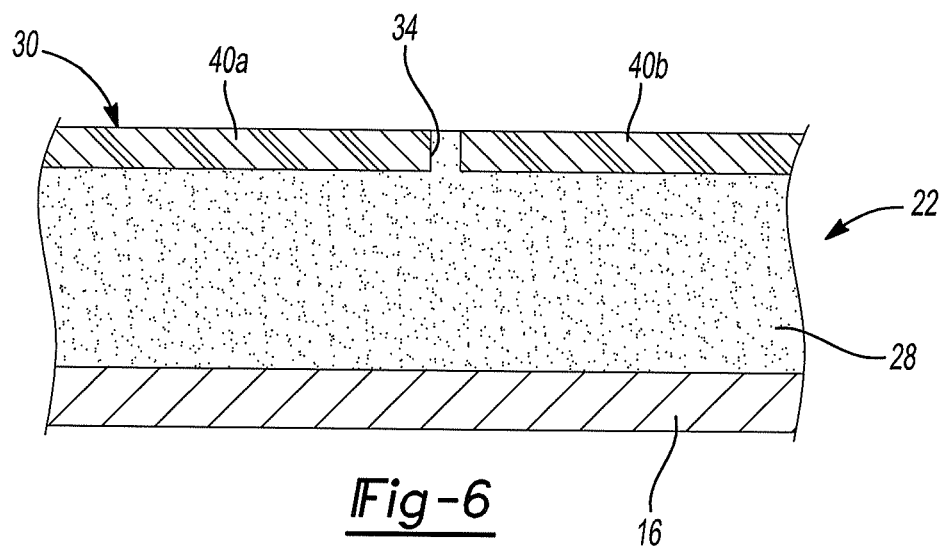
FIG. 6 is a cross-sectional view of the reinforcement patch after baking and curing.

Finally, the vehicle 10 is cured. During curing of the vehicle 10, the outer door panel 16 shrinks (or contracts) toward its original size, which causes the tabs 40a, 40b to return toward their original position. It is understood that when the tabs 40a, 40b return toward their original position, the slit 34 also narrows. Also, curing of the vehicle 10 allows a portion of the substrate 28 to flow into the slit 34 formed between the tabs 40a, 40b (FIG. 6). When the vehicle 10 reaches ambient temperature, the reinforcing body 30 and the substrate 28 is solid, thereby providing additional strength and stiffness to the door 14.

The reinforcement patches 22 of the present disclosure provide the benefit of adding strength and stiffness to the vehicle doors 14 while minimizing surface distortions due to the dissimilar coefficients of thermal expansion between the doors 14 and the reinforcement patches 22. That is, vehicle doors 14 having substantially flat panels with low curvature and minimal feature lines are more susceptible to visible surface distortions due to dissimilar coefficients of thermal expansion between the doors 14 and the reinforcement patches 22. The reinforcement patches 22 of the present disclosure being allowed to conform to the doors 14 during the vehicle 10 baking and curing cycle minimizes the surface distortion in the doors 14 while providing the benefit of added stiffness and strength to the doors 14.

While reinforcement patches 22 shown in figures are disposed in the doors 14, other vehicle body components (e.g., vehicle body panels 13) could include the reinforcement patches 22.

What is claimed is:

1. A vehicle comprising:
   a vehicle body component including an outer panel and an inner panel that collectively define a cavity therebetween, the outer panel having an interior surface that faces the cavity and the inner panel, and the outer panel being formed of a material having a first coefficient of thermal expansion that permits the outer panel to expand and contract; and
   a reinforcing patch disposed within and attached to the interior surface of the outer panel, the reinforcing patch including a substrate formed of an adhesive material that adheres the reinforcing patch to the interior surface of the outer panel, and a reinforcing body attached to the substrate that faces the cavity,
   wherein the reinforcing body is formed of a material having a second coefficient of thermal expansion that is less than the first coefficient of thermal expansion that permits the reinforcing body to expand and contract to a lesser extent than the outer panel;
   wherein the reinforcing body includes a first end and an opposite second end, the first end and the opposite second end being connected by a first edge extending between the first end and the opposite second end and an opposite second edge extending between the first end and the opposite second end;
   wherein a plurality of elongated slits are formed in the reinforcing body that extend between the first edge and the opposite second edge, the material of the reinforcing body located on opposing sides of a respective elongated slit defining a first tab and a second tab with the respective elongated slit therebetween; and
   wherein the first tab and the second tab are configured to move in opposite directions when the outer panel expands due to the material of the reinforcing body having the second coefficient of thermal expansion that is less than the first coefficient of thermal expansion of the material of the outer panel.

2. The vehicle of claim 1, wherein a plurality of second elongated slits are formed in the reinforcing body that extend between adjacent elongated slits, the plurality of second elongated slits cooperating with the respective elongated slits to define a plurality of the first tabs and a plurality of the second tabs with the respective elongated slit therebetween.

3. The vehicle of claim 2, wherein each of the elongated slits are angled such that each elongated slit extends toward the opposite second end of the reinforcing body as the elongated slit extends from the first edge toward the opposite second edge of the reinforcing body, and wherein each of the second elongated slits are angled such that each of the second elongated slits extend toward the first end of the reinforcing body as each of the second elongated slits extend toward the opposite second edge of the reinforcing body.

4. The vehicle of claim 2, wherein the plurality of first tabs and the plurality of second tabs are diamond-shaped.

5. The vehicle of claim 1, wherein the adhesive material includes an epoxy.

6. The vehicle of claim 1, wherein the material of the reinforcing body is a cloth made of fiberglass.

7. The vehicle of claim 1, wherein when the outer panel expands and the first tab and the second tab move in opposite directions, the respective elongated slit is configured to widen and permit the substrate to expand within the respective elongated slit.

8. The vehicle of claim 1, wherein when the outer panel contracts, the first tab and the second tab are configured to move towards each other to narrow the respective elongated slit and permit the adhesive material of the substrate to harden within the respective elongated slit.

9. The vehicle of claim 1, wherein the respective elongated slit is at least partially filled by the adhesive material of the substrate.

\* \* \* \* \*